US005778596A

United States Patent [19]

Henderson et al.

[11] Patent Number: 5,778,596
[45] Date of Patent: Jul. 14, 1998

[54] TERMITE BAIT APPARATUS AND METHOD

[75] Inventors: Gregg Henderson; Jian Chen, both of Baton Rouge, La.

[73] Assignees: Board of Supervisors of Louisiana State University; Agricultural and Mechanical College

[21] Appl. No.: 755,810

[22] Filed: Nov. 26, 1996

Related U.S. Application Data

[60] Provisional application No. 60/035,348, Dec. 7, 1995.

[51] Int. Cl.$^6$ ............................ A01N 25/00; A01M 1/20
[52] U.S. Cl. ............................ 43/132.1; 43/124; 43/131
[58] Field of Search ............................ 43/124, 131, 132.1

[56] References Cited

U.S. PATENT DOCUMENTS

| | | | |
|---|---|---|---|
| 3,826,036 | 7/1974 | Neugebauer | 43/132.1 |
| 4,485,582 | 12/1984 | Morris | 43/132.1 |
| 5,123,202 | 6/1992 | Tanisake | 43/132.1 |
| 5,238,681 | 8/1993 | Chang et al. | 43/132.1 |
| 5,446,992 | 9/1995 | Stewart | 43/131 |
| 5,628,143 | 5/1997 | Doucette | 43/124 |

FOREIGN PATENT DOCUMENTS

| | | | |
|---|---|---|---|
| 0125639 | 8/1982 | Japan | 43/132.1 |
| 406078655 | 3/1994 | Japan | 43/132.1 |
| 2095965 | 10/1982 | United Kingdom | 43/132.1 |
| 2095966 | 10/1982 | United Kingdom | 43/132.1 |
| WO93000803 | 1/1993 | WIPO | 43/124 |
| WO9323998 | 12/1993 | WIPO | |

OTHER PUBLICATIONS

J. French, "Baits and Foraging Behavior of Australian Species of Coptotermes," Sociobiology, vol. 19, pp. 171-186 (1991).

J. French, "Combining Physical Barriers, Bait and dust Toxicants in Future Strategies for Subterranean Termite Control (Isoptera)," Sociobiology, vol. 24, pp. 77-91 (1994).

DowElanco, "Sentrican Colony Elimination System," Down to Earth, vol. 50 (1995).

N. Su "Field Evaluation of a Hexaflumuron Bait for Population Suppression of Subterranean Termites (Isoptera: Rhinotermitidac)," J. Econ. Entomol., vol. 87, pp. 389-397 (1994).

J. Chen, "Behavioral and Chemical Ecology of Formosan Subterranean Termites, Coptotermes formosanus Shiraki," PhD Dissertion (Louisiana State University, Baton Rouge, 1995).

*Primary Examiner*—Terry Lee Melius
*Assistant Examiner*—Fredrick T. French, III
*Attorney, Agent, or Firm*—John H. Runnels

[57] ABSTRACT

A termite bait system is disclosed having two compartments, a non-toxic preconditioning compartment (or "P-compartment") and a toxicant compartment (or "T-compartment"). A passage connects the P-compartment to the T-compartment. Initially this passage is blocked by a plug of a material that termites can eat through over time. The P-compartment contains a small amount of food without any toxicant. The T-compartment contains food that has been treated with a toxicant. Termites from the targeted colony—or from a different, but amicable colony—are placed in the P-compartment, where they are allowed to feed on the non-toxic food. An exit from the P-compartment, for example a tube, leads to a shelter tube of the targeted colony. The shelter tube is preferably left undisturbed by the operator of the CPBS system. Termites from the P-compartment build a shelter tube or lay down chemical signals from the P-compartment to the target colony or its shelter tubes. Termites from the target colony then travel to the P-compartment, where they feed on the non-toxic food. After a time, the termites eat through the plug between the two compartments, and begin feeding on the toxicant-laced food in the T-compartment. The colony eventually dies as toxicant is distributed throughout the colony.

27 Claims, 1 Drawing Sheet

TERMITE BAIT APPARATUS AND METHOD

The benefit of the Dec. 7, 1995 filing date of provisional application 60/035,348 (which was a conversion of nonprovisional application 08/568,811) is claimed under 35 U.S.C. § 119(e).

This invention pertains to a termite bait apparatus and method for delivering a toxicant to a colony of termites, for example a termite bait apparatus and method for delivering a toxicant to a colony of Formosan termites.

The Formosan subterranean termite, *Coptotermes formosanus* Shiraki, is a major worldwide pest that attacks both living trees and structural wood. Unlike other subterranean termites, the Formosan termite can establish a colony that does not touch the ground.

*Coptotermes formosanus* is native to southeast Asia, but is now also found in Hawaii, along the southeastern Atlantic coast of the United States, the Gulf South of the United States, Guam, Midway Island, Brazil, Sri Lanka, and Africa. First discovered in the United States by pest control operators in 1965, *C. formosanus* has gradually expanded its geographic domain. The largest single locus of *C. formosanus* in the United States is in south Louisiana, with heavy infestations in Lake Charles and New Orleans.

*C. formosanus* continues to cause great structural damage to many buildings in the Lake Charles and New Orleans areas, including damage to many buildings of historic significance. There is particular concern for the future of New Orleans' French Quarter, where many historic buildings are already severely damaged and would be quite expensive to repair.

Three principal methods have been used in the past to control Coptotermes: (1) chemical and physical barriers to prevent termites from attacking wood, (2) wood preservatives and termiticides used to protect infested or susceptible wood, and (3) destruction of a termite colony by excavation of the nest.

Chemical barriers and termiticides have generated public concern over environmental safety.

In China excavation of the nest has been one of the main methods used to control Formosan termites. However, locating a termite nest is typically very time-consuming, limiting the usefulness of the practice.

Using a bait to deliver a termiticide has several advantages. Baits typically require only a small amount of toxicant, and they target only the insects that feed on the bait. Thus non-target organisms are not affected, diminishing the environmental impact of the toxicant. Use of a bait makes it unnecessary to locate the nest because many termites, including Formosan termites, engage in trophallaxis (transfer of food to other colony members) and allogrooming (licking one another). Thus a toxicant may be spread throughout a colony after feeding by only a few foraging termites. Bait methods have previously been used to detect and experimentally control subterranean termites, and to trap termites for studies on termite ecology.

A major problem with existing baiting techniques against Coptotermes and other termites has been inconsistent bait acceptance. The use of termite baits is different from the use of ant baits and cockroach baits, because it is usually not possible to remove competing food sources for termites. Baits placed within termite galleries are often bypassed and left uneaten. In any baiting method, it is important to locate foraging termites. Placing baits where the termites are most active increases the probability that the termites will encounter the bait over a specified time period. Attractants and food stimulants can sometimes increase the consistency of bait acceptance, but there remains a continuing need for improved termite baits.

Formosan termites forage both above ground and below ground. Many types of termites, including Formosan termites, build shelter tubes above ground to protect themselves from predation and from desiccation. Below ground they excavate and maintain foraging tunnels. Shelter tubes and underground tunnels are often used over long periods of time to travel to foraging sites. A fresh shelter tube is a reliable sign of recent termite activity. Shelter tubes are often the only readily apparent sign of a termite infestation.

J. French, "Baits and Foraging Behavior of Australian Species of Coptotermes," Sociobiology, vol. 19, pp. 171–186 (1991) discloses both surface baiting and underground baiting techniques for termite bait placement, the former including placing termite baits in or on termite shelter tubes or galleries; and the latter including box-bait containers, pipe-bait containers, and conduit-box-bait containers. French noted that the main problem in baiting techniques against Coptotermes species has been the inconsistency of bait acceptance. French observed that baits placed within galleries, and to a lesser extent shelter tubes, are often bypassed and not eaten.

J. French, "Combining Physical Barriers, Bait and Dust Toxicants in Future Strategies for Subterranean Termite Control (Isoptera)," Sociobiology, vol. 24, pp. 77–91 (1994) discloses a variety of means to prevent or control termite infestations, including placing bait toxicant wood blocks in conduit-box-bait containers.

One prior method of controlling termite infestations uses an in-ground wood monitoring device to detect termite activity. If periodic inspection of the monitoring device reveals the presence of termites, "recruiter" termites from the monitoring device are removed and placed in a bait tube, which is then returned to the same location in the ground. The bait material contains a cellulosic bait matrix with toxicant such as hexaflumuron, an insect growth regulator. To exit the bait station, the captured termites must chew or tunnel through the toxicant-containing matrix before returning to the nest. The "recruiter" termites leave chemical markers identifying a food source to other members of the colony, and may also deliver toxicant to the nest via trophallaxis or cannibalism. See DowElanco, "Sentricon Colony Elimination System," Down to Earth, vol. 50 (1995); N. Su, "Field Evaluation of a Hexaflumuron Bait for Population Suppression of Subterranean Termites (Isoptera: Rhinotermitidae)," J. Econ. Entomol., vol. 87, pp. 389–397 (1994); and N. Su et al., International Patent Publication No. WO 93/23998 (1993).

Because it is usually easier to locate shelter tubes than to locate a termite nest, a reliable bait delivery system suitable for placement in or on shelter tubes would provide an improvement over current methods for controlling termites. Prior above-ground termite baits have had limited success. Termites often bypass such baits, even when they are placed directly in shelter tubes. This avoidance may result from the termites' retreating from the disturbance that occurs when the shelter tube is broken for baiting.

Previously unpublished research from our laboratory has found that termites seldom move laterally outward from the side of a shelter tube after the tube has been completed. We have discovered a technique for inducing termites to create a lateral passageway into a shelter tube, to draw termites from the shelter tube towards a bait. We have discovered a novel delivery system to accomplish this goal, a delivery system that minimizes or eliminates any disturbance of the termites, and that increases the termites' propensity to consume the bait.

When termites from the same colony—or even from a different (but "amicable") colony are placed in a food source, those termites can enhance food-finding by termites from the nest. We have developed a novel termite control system that exploits these findings, a system that we have named the "compartmentalized preconditioned bait system," or CPBS.

The novel CPBS bait system has two compartments, a non-toxic preconditioning compartment (or "P-compartment") and a toxicant compartment (or "T-compartment"). A passage connects the P-compartment to the T-compartment. Initially, however, this passage is blocked by a plug of a material that termites can eat through over time. The P-compartment contains a small amount of food without any toxicant. The T-compartment contains food that has been treated with a toxicant. Termites from the targeted colony—or from a different, but amicable colony—are placed in the P-compartment, where they are allowed to feed on the non-toxic food. ("Amicable" termite colonies are those whose members are not aggressive towards one another. Colonies of Formosan termites living in relative geographic proximity are often "amicable" to one another, perhaps in part because of close genetic relatedness and consequent similarity in chemical signals.) An exit from the P-compartment, for example a flexible plastic tube, leads to a shelter tube of the targeted colony. The shelter tube is preferably left undisturbed by the operator of the CPBS system. Termites from the P-compartment build a new shelter tube from the P-compartment to the target shelter tube, and they join the two shelter tubes together. This new shelter tube is constructed from suitable materials that have also been placed in the P-compartment, for example dirt or sand, preferably sand such as #4 fine sand. Termites from the target colony then travel through the new shelter tube to the P-compartment, where they feed on the non-toxic food. After a time, the termites eat through the plug between the two compartments, and begin feeding on the toxicant-laced food in the T-compartment. The colony eventually dies as toxicant is distributed throughout the colony.

The novel CPBS bait system has a number of advantages. (1) Placing termites in a bait prior to placing the bait near a targeted colony facilitates bait-finding by the targeted colony. (2) The block between the two compartments helps targeted termites avoid contacting "toxic termites" prematurely. Termites in a CPBS bait have access to the toxicant only after the targeted colony has established feeding at the bait, because the passage between the two compartments is initially blocked; the time required to eat through the block (e.g., a cardboard roll) allows construction of the connecting shelter tube before termites can enter the T-compartment. (3) The compartmentalization reduces the disturbance to potential foragers. (4) The CPBS system does not require prior activity at a bait station. (5) Placement of the CPBS bait may be guided by visible termite activity, because its target is a shelter tube. (6) The termites placed in the P-compartment may alternatively be from the target colony itself, or from a different (but "amicable") colony. Termites in the P-compartment can be collected from infested tree trunks, structural wood, or even other termite baits. (7) Termites from the targeted colony feed on the non-toxic materials in the P-compartment before feeding on toxic materials in the T-compartment. This arrangement allows more time for the termites to become accustomed to the bait without adverse conditioning. (8) Because the target of CPBS is a shelter tube of the colony to be controlled, above-ground infestations of termites such as Formosan termites may be controlled. (9) The design of the CPBS system enhances moisture retention by the bait, which in turn enhances feeding (10) Recruitment by termites from the P-compartment results in the rapid consumption of toxic bait from the T-compartment; it is not necessary to wait for targeted termites to find the bait unassisted. (11) The total amount of toxicant required is small, and its delivery to the targeted pests is precise, minimizing environmental impact.

The novel technique may be used with any termites of the order Isoptera that build shelter tubes, including by way of example and not limitation Coptotermes, Reticulitermes, Heterotermes, Mastotermes, Anacanthotermes, Psammotermes, Prorhinotermes, Schedorhinotermes, Glyptotermes, Neotermes, Marginitermes, Pericapritermes, Allodontermes, Microtermes, Odontotermes, Nasutitermes, Termes, and Globitermes.

With slight modification, the novel technique may also be used with termites of the order Isoptera that do not build shelter tubes, including by way of example and not limitation Zootermopsis, Cryptotermes, Incisitermes, Kalotermes, Amitermes, Microcerotermes, and Hodotermopsis. Modifications of the technique for non-shelter tube termites would be to place the exit from the P-compartment near an entrance to the colony (rather than near a shelter tube), and to omit placing in the P-compartment a material from which the "recruiter" termites may build a shelter tube. The "recruiter" termites from the P-compartment lay down chemical trails and signals to draw termites from the target colony to the bait.

For non-shelter-tube termites, the novel technique has the following advantages: (1) Placing termites in a bait prior to placing the bait near a targeted colony facilitates bait-finding by the targeted colony. (2) The block between the two compartments helps targeted termites avoid contacting "toxic termites" prematurely. Termites in a CPBS bait have access to the toxicant only after the targeted colony has established feeding at the bait, because the passage between the two compartments is initially blocked; the time required to eat through the block (e.g., a cardboard roll) allows time to establish chemical trails and signals between the bait and the colony before termites can enter the T-compartment. (3) The compartmentalization reduces the disturbance to potential foragers. (4) The CPBS system does not require prior activity at a bait station. (5) Placement of the CPBS bait may be guided by visible termite activity. (6) Termites from the targeted colony feed on the non-toxic materials in the P-compartment before feeding on toxic materials in the T-compartment. This arrangement allows more time for the termites to become accustomed to the bait without adverse conditioning. (7) Above-ground infestations of termites may be controlled. (8) Recruitment by termites from the P-compartment results in the rapid consumption of toxic bait from the T-compartment; it is not necessary to wait for targeted termites to find the bait unassisted. (9) The total amount of toxicant required is small, and its delivery to the targeted pests is precise, minimizing environmental impact.

Figure 1:
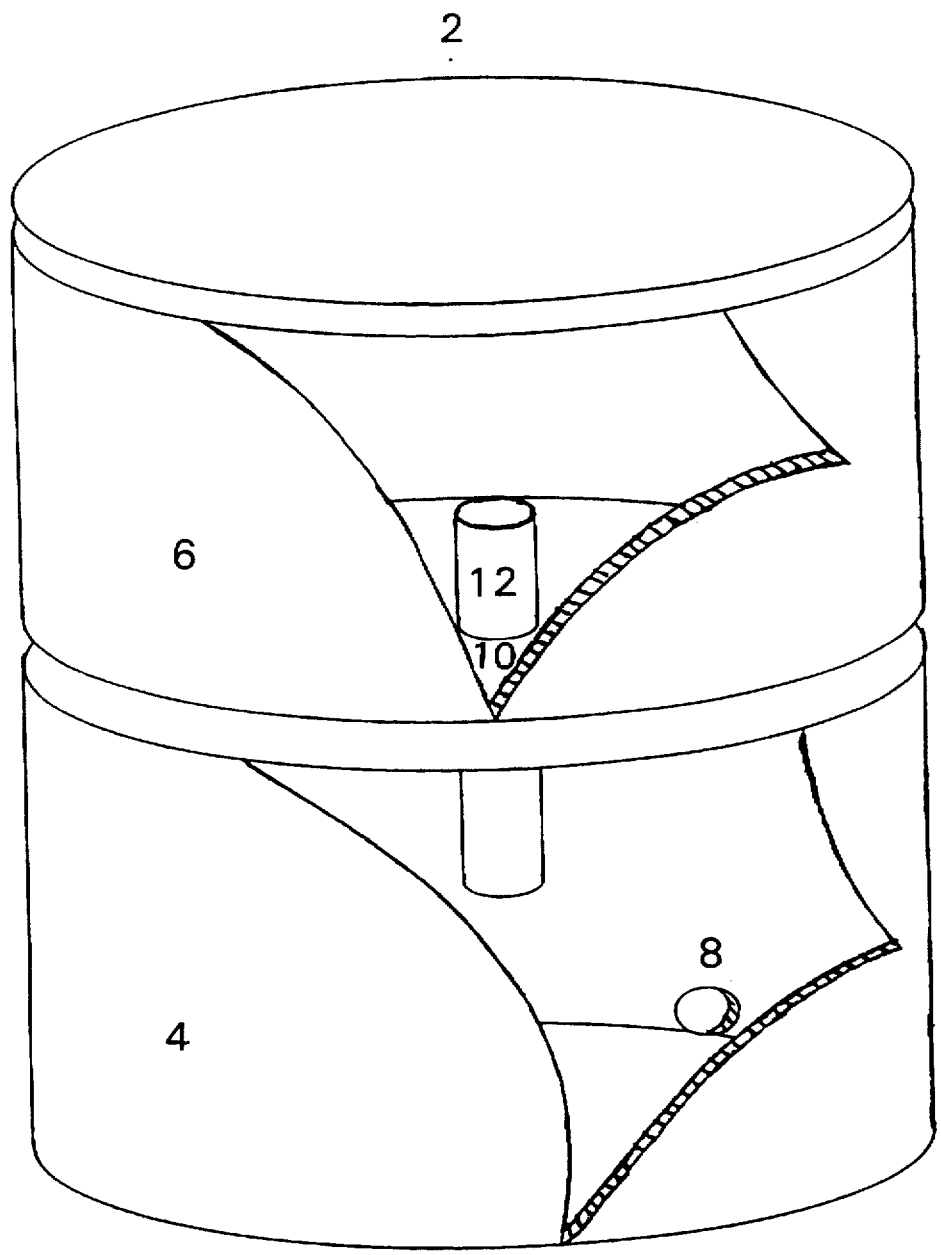
FIG. 1 illustrates a cut-away view of an embodiment of a compartmentalized preconditioning bait system in accordance with the present invention.

Construction of One Embodiment of the Compartmentalized Preconditioning Bait System As illustrated in the cut-away view shown in FIG. 1, one embodiment 2 of a novel bait container in accordance with this invention had two compartments, a non-toxic preconditioning compartment (or "P-compartment") 4, and a toxicant compartment (or "T-compartment") 6. Toxicant compartment 6 is preferably sealed to reduce the likelihood of inadvertent exposure to the toxicant. In the illustrated embodiment, both compartments 4 and 6 were constructed of an impervious polymer in a cylindrical shape about 5 cm in diameter and about 3.6 cm high. A small exit 8 (0.3 cm diameter) left the bottom of P-compartment 4, and a slightly larger passage 10 (0.5 cm diameter) connected the P-compartment and the T-compartment. Initially, however, exit 8 was blocked with a plastic plug (not shown), and passage 10 was initially blocked by roll of corrugated cardboard 12 to confine termites to P-compartment 4 prior to placement of the bait system near the targeted colony.

For each of the experiments described below in which termites were initially present in P-compartment 4, the termites were allowed to feed on cardboard in P-compartment 4 for two days or more prior to commencing the experiment. The plastic plug in exit 8 was then removed and replaced with a length of tygon tubing (not shown), and the exit of the tygon tubing was placed near a shelter tube of the target colony. Termites from P-compartment 4 then built shelter tubes through the tygon tubing that they joined to the shelter tube of the targeted colony, providing termites from the targeted colony a direct route to the bait. Termites from the target colony first entered P-compartment 4, ate through block 12 through passage 10 connecting the compartments, and entered T-compartment 6 to feed on toxicant-laced food material in T-compartment 6.

Demonstraion Tests of the CPBS Without Toxicant

Several experiments were initially conducted with no toxicant in the T-compartment, to demonstrate that termites in the P-compartment accelerate the targeted colony's location of the bait. Two Formosan subterranean termite colonies were used in these experiments, colonies that were designated "N3" and "N4." Both colonies were newly collected from New Orleans, La. Colony N3 was visually estimated to contain more than 100,000 individuals. This colony was kept in a large plastic trash container with carton nest material, corrugated cardboard, and pieces of pine wood. Colony N3 was the targeted colony in each of the following experiments. The CPBS was tested after the N3 colony had established shelter tubes on the outer wall of the plastic container.

EXPERIMENT 1

No Termites in P-Compartments.

Three CPBS baits were used in this experiment. Four-fifths of each P-compartment was filled with moistened, dyed sand (0.1% Dayglo® water dispersion blaze orange dye (Nalco Chemical Co., Cleveland, Ohio). The dye was used to identify the origin of the materials used to build any new shelter tube. A piece of moistened corrugated cardboard (2 cm×2 cm) was placed on the bottom of the P-compartment. A cylindrical roll of moistened corrugated cardboard (5 cm diameter, 3.6 cm long) was placed in (and essentially filled) the T-compartment. In this experiment, the plug between the compartments was a roll of corrugated cardboard. The material of which the plug is formed may be any material that is edible to termites, and may be selected to control the length of time it takes the termites to eat through it. For example, if a longer time is desired the block may be of pine wood or other harder cellulose product. Tygon tubing was placed between the outlet of the P-compartment and a shelter tube of the targeted colony. Care was taken not to damage the existing shelter tube of the targeted colony. The objective was to determine whether termites would build shelter tubes in the tygon tubing to connect the P-compartment to the existing shelter tube of the colony. The experiment was stopped after seven days.

During the seven-day period of this experiment, the termites did not build a shelter tube to any of the three baits.

EXPERIMENT 2

Termites From the Targeted Colony Present in P-Compartment.

Four CPBS baits were used. Except as described below, the baits were prepared and placed near a shelter tube of target colony N3 as otherwise described for Experiment 1. One hundred workers and ten soldiers from colony N3 were placed in the P-compartments of three of the four CPBS baits. One CPBS bait with no termites served as control. The time required for termites to build connecting shelter tubes from the P-compartments to a shelter tube of the targeted colony was recorded. The experiment was stopped after seven days.

A shelter tube connecting the P-compartment to an existing shelter tube of the colony was built for each of the three baits containing nestmate termites. The average time to complete the new connecting shelter tubes was 9.6±0.6 hours. In all three cases, the connecting shelter tubes were joined to the targeted shelter tube between the exit from the Tygon tube and the target shelter tube. Most of the material used to make the connecting shelter tube was dyed sand from the P-compartment. In the control CPBS (without termites), no connecting shelter tube was built after one week of observation.

EXPERIMENT 3

Non-Nestmate Termites Present in P-Compartment.

Four CPBS baits were used. Except as stated below, the baits were prepared and placed near a shelter tube of target colony N3 as otherwise described for Experiment 2. The P-compartments of three CPBS baits had termites, and one control bait had no termites. One hundred workers and ten soldier termites from colony N4, a different colony, were placed in each of the three CPBS baits. The time required for termites to build connecting shelter tubes from P-compartments to a shelter tube of the targeted colony was recorded. The experiment was stopped after seven days.

A shelter tube connecting the P-compartment to an existing shelter tube of the colony was built for each of the three baits containing non-nestmate termites. The average time to complete the new connecting shelter tubes was 16.5±2.3 hours. In all three cases, the connecting shelter tubes were joined to the targeted shelter tube between the exit from the Tygon tube and the target shelter tube. Most of the material used to make the connecting shelter tube was dyed sand from the P-compartment. In the control CPBS (without termites), no connecting shelter tube was built after one week of observation.

Statistical Significance of Results

The data from Experiments 1, 2, and 3 were used in a Wilcoxon rank sign test (SAS Institute 1988) to evaluate the statistical significance of the time differences for the target colony termites to locate the bait for P-compartments with and P-compartments without termites. (Data from the "no-termite" controls of Experiments 1, 2, and 3 were pooled to serve as a common control group.) A t-test was used to evaluate the statistical significance of the time differences for the target colony termites to locate the bait for P-compartments with nestmate termites versus P-compartments with non-nestmate termites.

There was a statistically significant difference in the time required for the targeted termites to find the baits when termites were initially present in the P-compartment, as compared to baits without termites (P=0.032). There also was a statistically significant difference in the shorter time required for termites to find the baits when nestmate termites were in P-compartment versus the longer time required when non-nestmate termites were in the P-compartment (P=0.046).

EXPERIMENT 4

Toxicant in the in the T-Compartment

In this experiment, the objective was to determine whether placing N3 termites in the P-compartment would facilitate consumption by the N3 target colony of a sulfluramid-toxicant bait in the T-compartment. Except as stated below, the baits were prepared and placed near a shelter tube of target colony N3 as otherwise described for Experiment 2. Four CPBS baits, numbered B1, B2, B3, and B4, were used. In the T-compartments of baits B1, B2, B3, and B4 were placed cylindrical rolls of corrugated cardboard (5 cm diameter, 3.5 cm long) impregnated with 0.0, 10.0, 50.0, and 100.0 ppm by weight, respectively, of sulfluramid (Griffin Corporation, Valdosta, Ga.). The solvent acetone was used to impregnate the cardboard with the sulfluramid. After the acetone had evaporated, the cardboard was moistened with distilled water and placed into the T-compartment. Four-fifths of each P-compartment was filled with moistened, Dayglo®-dyed sand. A piece of non-toxic moistened corrugated cardboard (2 cm×2 cm) was placed on the bottom of each P-compartment. One hundred workers and ten soldiers from the N3 target colony were placed in each P-compartment. On the 8th and 23rd days of the experiment, the T-compartments were briefly removed, and the cardboard in each T-compartment was changed with fresh cardboard holding the same amount of toxicant as held by the initial cardboard. Consumption of the T-compartment cardboard was recorded for each bait until the N3 colony had died out.

Termites attacked the cardboard in all four T-compartments in this experiment. We observed a tendency for total bait consumption to decrease as the concentration of sulfluramid increased. However, the total consumption of sulfluramid from each bait increased with increasing sulfluramid concentration. Cardboard was no longer consumed after 23 days. See the Table below.

TABLE

| Concentration of Sulfluramid in Cardboard (ppm) | Cumulative Consumption of Cardboard (g) | | | | Cumulative Consumption of Sulfluramid (mg) (Day 32) |
|---|---|---|---|---|---|
| | Day 0 | Day 8 | Day 24 | Day 32 | |
| 0 | 0 | 4.93 | 12.25 | 12.25 | 0 |
| 10 | 0 | 5.53 | 11.57 | 11.57 | 0.116 |
| 50 | 0 | 4.94 | 10.86 | 10.86 | 0.543 |
| 100 | 0 | 2.74 | 7.20 | 7.20 | 0.7201 |

Inspection of the colony at 23 days revealed that mortality had begun. The termites made sluggish movements and had flattened abdomens. No living termites remained in the colony after 32 days. A total of 1.38 mg of sulfluramid was consumed by the colony.

The toxicant used in this invention may be any substance that kills termites or impedes their growth, including chemical insecticides; pathogenic nematodes, fungi, protozoans, or bacteria; or biological controls such as insect growth regulators. Preferred toxicants are slow-acting (i.e., acting over a course of hours, days, or weeks, preferably days or weeks), to reduce "avoidance" effects before individuals have distributed food to other members of the colony. Several suitable slow-acting toxicants for termites are known in the art, and include, for example silafluofen; borates (boric acid, disodium octaborate tetrahydrate); sulfluramid and other fluoroalkyl sulfonamides; avermectin; hydramethylnon; hexaflumuron and other chitin synthesis inhibitors and other acyl ureas; diflubenzuron (Dimilin); azadirachtin; dechlorane (Mirex); diiodomethyl-para-tolyl sulfone (A-9248); fluorosulfonates; imidacloprid; azadirachtin; cyromazine; juvenile hormones and juvenile hormone mimics or analogs such as fenoxycarb, methoprene, hydroprene, triprene, furnesinic acid ethyl and alkoxy derivatives, and pyriproxyfen (Nylar); and the plant *Rheuneo jupanic* Thunb. Roth. In addition, otherwise faster-acting insecticides may act more slowly if microencapsulated. Biological control agents that may be used as toxicants include fungi that are pathogenic to insects, such as *Metarhizium anisopliae, Aspergillus flavus*, and *Beauveria bassiania*; nematodes that are pathogenic to insects, such as *Neoplectana carpocapsae*; insect viruses; pathogenic bacteria such as *Bacillus thuringiensis* and *Serratia marcescens*; or toxins derived from biological control agents such as *Bacillus thuringiensis* toxin.

Preferred termite bait materials to use in the P-compartment, the T-compartment, and the plug connecting the compartments include cardboard, paper, sawdust, dried semi-aqueous cellulose mixtures, other cellulose-containing materials, or wax. Optionally, these bait materials may incorporate a feeding stimulant such as those disclosed, for example, in commonly-assigned U.S. patent application Ser. No. 08/243,950, filed May 17, 1994. An alternative to impregnation of the bait in the T-compartment with toxicant is to manufacture paper or cardboard containing the toxicant in the paper or cardboard from the beginning. Adding moisture to the bait can help increase its attractiveness to many kinds of termites. The novel bait design is well-adapted for retaining moisture if desired. Optionally, a humectant such as methylcellulose saturated with water may be added to either or both compartments of the CPBS bait to maintain moisture content.

An optional method to reduce the impact of any learning effects is to periodically replace the T-compartment with a new T-compartment containing a different toxicant, a different food source, or both.

Another optional method of practicing this invention is to place a toxicant in the T-compartment that is not necessarily incorporated into the food source, such as a toxic dust. The toxicant will adhere to termites in the T-compartment by physical contact, and the termites will distribute the toxicant to other colony members.

The entire disclosures of all references cited in this specification are hereby incorporated by reference in their entirety. Also incorporated by reference is the following doctoral dissertation, which was unpublished as of the filing date of this application, and which had not yet been catalogued or shelved in any library: J. Chen, "Behavioral and Chemical Ecology of Formosan Subterranean Termites, *Coptotermes formosanus* Shiraki," PhD Dissertation (Louisiana State University, Baton Rouge, 1995). In the event of a conflict, however, the present specification shall control.

We claim:

1. A method for exterminating termites in a colony, said method comprising the steps of:
    (a) positioning near the colony an apparatus for delivering a toxicant, wherein the apparatus comprises:
        (i) a first compartment containing a first termite food source and a termite toxicant;

(ii) a second compartment containing first termites, and a second termite food source, wherein the second compartment lacks a termite toxicant, and wherein the second compartment has an exit through which the termites can travel to the colony; and (iii) a passage between the first and second compartments through which termites can move, wherein the passage is initially blocked by a plug comprising a substance that termites will eat;

(b) allowing the first termites to feed on the second termite food source, to exit the second compartment, to travel toward the colony, and to establish chemical signals to draw termites from the colony to the second compartment;

(c) allowing second termites from the colony to travel to the second compartment, and to feed on a sufficient amount of the plug to permit passage between said first and second compartments; and (d) allowing the second termites to feed on the first termite food source, to contact the toxicant, and to distribute the toxicant to other termites in the colony, until termites in the colony are exterminated by the effect of the toxicant.

2. A method as recited in claim 1, wherein:

(a) the colony has built one or more first shelter tubes;

(b) the second compartment additionally comprises a material from which the first termites may construct a second shelter tube;

(c) the apparatus is positioned so that the exit of the second compartment is near a first shelter tube of the colony; and (d) the first termites are allowed to build a second shelter tube from the exit of the second compartment, connecting to a first shelter tube of the colony, and second termites from the colony are allowed to travel through the first and second shelter tubes to the second compartment.

3. A method as recited in claim 2, wherein the apparatus additionally comprises a tube connected to the exit of the second compartment, and wherein the first termites are allowed to build the second shelter tube in said tube.

4. A method as recited in claim 3, wherein each of the first termite food source and the second termite food source is moistened with water.

5. A method as recited in claim 4, wherein each of the first termite food source, the second termite food source, and the plug comprises corrugated cardboard; and wherein the material comprises sand.

6. A method as recited in claim 5, wherein the first termite food source comprises corrugated cardboard impregnated with sulfluramid.

7. A method as recited in claim 2, wherein the first and second termites are *Coptotermes formosanus*.

8. A method as recited in claim 7, wherein the first and second termites are termites from the same colony.

9. A method as recited in claim 7, wherein the first and second termites are termites from different, amicable colonies.

10. A method as recited in claim 1, wherein the first and second termites are termites from the same colony.

11. A method as recited in claim 1, wherein the first and second termites are termites from different, amicable colonies of the same species.

12. A method as recited in claim 1, additionally comprising the step of replacing the first compartment with a third compartment containing a third termite food source and a termite toxicant, wherein the termite toxicant of the third compartment differs from the termite toxicant of the first compartment, or wherein the third termite food source differs from the first termite food source.

13. An apparatus for delivering a toxicant to a termite colony, comprising:

(a) a first compartment adapted to hold a first termite food source comprising a termite toxicant;

(b) a second compartment adapted to hold termites, and a second termite food source lacking a termite toxicant, wherein said second compartment has an exit through which the termites can travel to the colony; and (c) a passage through which termites can move between said first and second compartments, wherein said passage is adapted to hold a plug comprising a substance that termites will eat, and wherein the plug will block passage of termites between said first and second compartments until the termites have eaten a sufficient amount of the plug to permit passage between said first and second compartments.

14. An apparatus as recited in claim 13, additionally comprising:

(a) a first termite food source and a termite toxicant, located in said first compartment;

(b) a second termite food source lacking a termite toxicant, located in said second compartment; and (c) a plug blocking said passage, wherein said plug comprises a substance that termites will eat, and wherein said plug blocks passage of termites between said first and second compartments until the termites have eaten a sufficient amount of said plug to permit passage between said first and second compartments.

15. An apparatus as recited in claim 14, additionally comprising termites located in said second compartment.

16. An apparatus as recited in claim 14, additionally comprising:

(a) a material, located in said second compartment, from which the termites may construct a shelter tube; and (b) a tube connected to the exit of said second compartment in which the termites can build a shelter tube.

17. An apparatus as recited in claim 16, additionally comprising termites located in said second compartment.

18. An apparatus as recited in claim 16, wherein each of said first termite food source and said second termite food source is moistened with water.

19. An apparatus as recited in claim 18, additionally comprising termites located in said second compartment.

20. An apparatus as recited in claim 18, wherein each of said first termite food source, said second termite food source, and said plug comprises corrugated cardboard; and wherein said material comprises sand.

21. An apparatus as recited in claim 20, additionally comprising termites located in said second compartment.

22. An apparatus as recited in claim 21, wherein said termites are *Coptotermes formosanus*.

23. An apparatus as recited in claim 20, wherein said first termite food source comprises corrugated cardboard impregnated with sulfluramid.

24. An apparatus as recited in claim 23, additionally comprising termites located in said second compartment.

25. An apparatus as recited in claim 24, wherein said termites are *Coptotermes formosanus*.

26. An apparatus as recited in claim 1, wherein said first compartment is replaceable.

27. An apparatus as recited in claim 1, wherein said first compartment is sealed, except for said passage, to minimize the risk of inadvertent exposure to the termite toxicant.

* * * * *